United States Patent [19]

Perlman et al.

[11] Patent Number: 5,261,597
[45] Date of Patent: Nov. 16, 1993

[54] TEMPERATURE RESPONSIVE 3-WAY LINE VALVE WITH SHAPE MEMORY ALLOY ACTUATOR

[76] Inventors: Maier Perlman, 344 York Hill Blvd., Thornhill, Ontario, Canada, L4J 3B6; James M. Bell, 1049 Albertson Crescent, Mississauga, Ontario, Canada, L5H 3C6; Richard L. Martin, 72 Kettletown Woods Rd., Southbury, Conn. 06488; Colin A. McGugan, 866 Ribston Road, Mississauga, Ontario, Canada, L4Y 1B1

[21] Appl. No.: 26,032
[22] Filed: Mar. 4, 1993
[51] Int. Cl.5 .................................. G05D 23/02
[52] U.S. Cl. ........................ 236/93 R; 236/101 D
[58] Field of Search .................... 236/93 R, 101 D; 137/115, 117

[56] References Cited

U.S. PATENT DOCUMENTS

| | | | |
|---|---|---|---|
| 3,237,862 | 3/1966 | Salerno et al. | 236/93 |
| 3,295,759 | 1/1967 | Wing | 236/93 |
| 3,378,063 | 4/1968 | Mefferd | 236/93 R X |
| 4,227,646 | 10/1980 | Hart et al. | 236/93 R X |
| 4,245,782 | 1/1981 | Brown | 236/34.5 |
| 4,285,467 | 8/1981 | Maltby | 236/86 |
| 4,492,219 | 1/1985 | Schoenheimer et al. | 126/427 |
| 4,570,851 | 2/1986 | Cirillo | 236/93 R |
| 4,570,852 | 2/1986 | Ohkata | 236/83 R |
| 4,973,024 | 11/1990 | Homma | 251/11 |
| 5,008,650 | 4/1991 | Hoiberg | 340/604 |
| 5,033,713 | 7/1991 | Thorsen et al. | 251/11 |
| 5,083,439 | 1/1992 | Orner et al. | 62/187 |
| 5,181,656 | 1/1993 | Schwerdt | 236/93 R X |

Primary Examiner—William E. Tapolcai

[57] ABSTRACT

The invention provides a self-contained automatic temperature-responsive three-way line valve. A tubular valve member is axially slidable between first and second limit positions for selectively directing fluid from an inlet port to a first outlet port or a second outlet port. The valve member is disposed between a pair of opposed compression springs, one being a conventional spring biasing the valve member to the first limit position and the other being an SME spring which overcomes the bias of the first-mentioned spring when the fluid exceeds a given temperature.

8 Claims, 1 Drawing Sheet

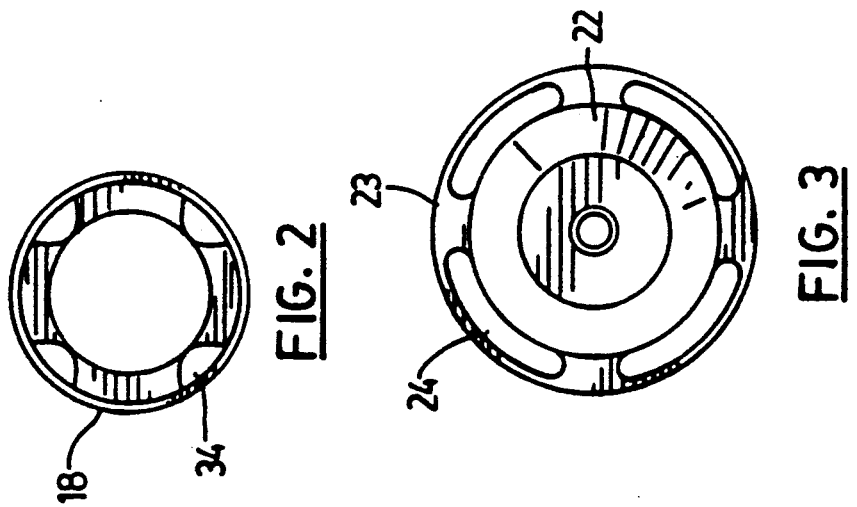
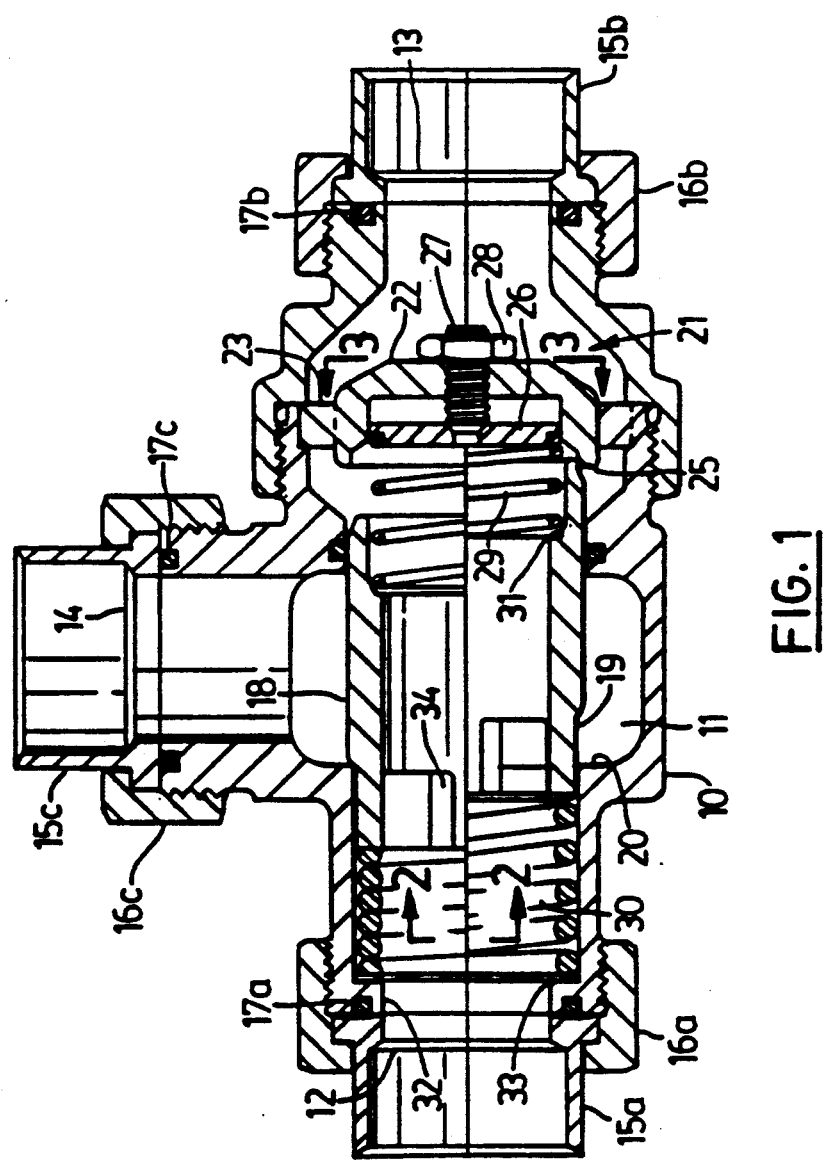

TEMPERATURE RESPONSIVE 3-WAY LINE VALVE WITH SHAPE MEMORY ALLOY ACTUATOR

FIELD OF THE INVENTION

The present invention relates to temperature-responsive, three-way line valves, such valves being commonly used in fluid supply lines to direct fluid selectively to one or other of two outlets depending on the fluid temperature.

BACKGROUND OF THE INVENTION

In a system in which a fluid is required to be supplied at a given controlled temperature, a three-way line valve may be used to divert the fluid to a heat exchanger or other device if its temperature differs from the required temperature. If the temperature is within the required supply range, the fluid is directed straight to the end use. For example, if the fluid is too hot, the valve will be used to divert it to a heat exchanger for cooling; similarly, if the fluid is too cold, the valve will be used to divert it to a heater.

Present systems of the kind referred to use electrically or pneumatically operated valves controlled by separate temperature sensors. Such valves are not self-contained but depend on external components and an external power supply for their control.

SUMMARY OF THE INVENTION

The present invention provides a temperature-responsive three-way line valve which is self-contained, fast acting, and operable automatically independently of external power.

Briefly, a valve according to the invention comprises a tubular valve body defining an internal chamber, the body providing an inlet port and first and second outlet ports which can be placed selectively in communication with the inlet port by means of a tubular valve member slidably mounted within the valve body for axial movement between first and second limit positions. In the first limit position of the valve member, communication between the inlet port and the second outlet port is closed, while in the second limit position of the valve member, communication between the inlet port and the first outlet port is closed. The valve member is disposed between two opposing biasing springs, one of which is of shaped memory effect (SME) alloy and of such a stiffness that, in the martensitic state of the alloy, its stiffness is overcome by the opposing spring and the valve member is retained in the first limit position while, in the austenitic state of the alloy, it overcomes the bias of the opposing spring to urge the valve member to the second limit position.

Since the state of the alloy changes from martensitic to austenitic, or vice versa, at a given temperature, the valve member is automatically switched between the two limit positions when the given temperature is reached.

BRIEF DESCRIPTION OF THE DRAWINGS

In order that the invention may be readily understood, a preferred embodiment thereof will now be described by way of example with reference to the accompanying drawings, in which:

FIG. 1 is a composite longitudinal sectional view of a temperature-responsive three-way valve according to the invention, the view being divided horizontally along the axis of the valve to show the valve member in each of its two limit positions;

FIG. 2 is an end view of the valve member taken on line 2—2 in FIG. 1; and

FIG. 3 is an end view of the spider assembly taken on line 3—3 in FIG. 1.

DESCRIPTION OF THE PREFERRED EMBODIMENT

Referring to FIG. 1, the valve comprises a tubular valve body 10 defining an internal chamber 11, the valve body providing an inlet port 12 at one end of the valve body, a first outlet port 13 at the other end of the valve body in axial alignment with the inlet port, and a second outlet port 14 communicating with the valve chamber 11 at a position between the inlet port 12 and the outlet port 13. Tube or pipe adaptors 15a, 15b, 15c are attached to the valve body 10 at each of the ports 12, 13, 14 by threaded nuts 16a, 16b, 16c. Seals 17a, 17b, 17c retained in mating grooves are provided at the inlet and outlet ports to prevent external leakage of fluid.

A tubular valve member or shuttle 18, is slidably mounted within the bore of the valve body 10 for reciprocatory axial movement between first and second limit positions, the first limit position being shown in the upper half of FIG. 1 and the second limit position being shown in the lower half of FIG. 1. The valve member 18 has a cylindrical wall formed with an annular step 19 which, in the first limit position of the valve member, engages an internal abutment edge 20 of the valve body, thus defining said first limit position.

A spider assembly 21 is located within the valve body 10 on the downstream side of the valve member 18. The spider assembly 21 comprises a support member having an imperforate central portion 22 and a perforate peripheral portion 23 providing slots 24 (shown in FIG. 3) which permit the passage of fluid from the valve chamber 11 to the first outlet port 13. The second limit position of the valve member 18 is defined by a peripheral abutment edge 25 of the central portion 22 of the spider assembly which is aligned with, and engageable with, the downstream edge of the valve member 18 as shown in the lower half of FIG. 1. A retainer plate or member 26 is mounted on the central portion 22 of the spider support member, coaxially with it, by means of an adjustment screw 27 carrying a lock nut 28.

The valve member 18 is disposed between a pair of opposed helical compression springs 29, 30. The first compression spring 29 is a conventional spring supported and constrained at one end by the retainer member 26, the other end of the spring engaging an internal abutment step 31 of the tubular valve member 18 thereby biasing the valve member towards the first limit position shown in the upper half of FIG. 1. It will be observed that, when the valve member is in this first limit position, communication between the inlet port 12 and the second outlet port 14 is closed, but fluid can flow from the inlet port 12 to the first outlet port 13 via the tubular valve member 18 and the spider slots 24.

The second compression spring 30 is of SME alloy which, when cold, is in the martensitic state but which changes to the austenitic state when heated to given temperature depending on the composition and processing of the alloy. When the alloy is in the martensitic state it exhibits a low modulus of elasticity, and when it is in the austenitic state it has a high modulus of elasticity. The stiffness of the first compression spring 29 is therefore chosen to be greater than that of the compression spring 30 when the latter is at a temperature lower than the transition temperature, but less than that of the compression spring 30 when the temperature of the latter exceeds the transition temperature.

In operation, when the fluid flowing through the valve is at a temperature less than a given temperature, i.e. the transition temperature, the valve member is in the first limit position, i.e. the "cold position" shown in the upper half of FIG. 1, the valve member being seated by engagement of the annular step 19 with the internal abutment edge 20. Fluid then flows from the inlet port 12, past the compression spring 30, through the inside of the tubular valve member 18, through the open coils of the compression spring 29, and through the spider slots 24 to the first outlet port 13. The second outlet port 14 remains closed.

When the fluid is heated to a given temperature, the compression spring 30 becomes more rigid so that the biasing spring 29 can no longer overcome the bias of the spring 30; therefore the valve member is moved rapidly to its second limit position shown in the lower half of FIG. 1. In this position fluid will flow from the inlet port to the second outlet port 14 via slots 34 at one end of the valve member.

The temperature at which the valve member 18 will be switched between the two limit positions can be adjusted by the adjustment screw 27, thereby to adjust the bias exerted by the first compression spring 29.

It will be seen that the SME spring 30 is located in an axial bore of the valve body 10, and is retained by an inwardly directed flange 32 of the valve body. The upstream end of the SME spring bears on a thermally insulating pad 33 mounted on the flange 32 for insulating the SME spring from the valve body. An important feature of the valve is that the SME spring, being a helical coil spring, is located in the axial bore adjacent to the inlet port 12 so as to induce turbulence in the incoming fluid and thereby enhance heat transfer between the fluid and the spring.

We claim:

1. A temperature-responsive three-way line valve comprising:
   a tubular valve body defining an internal chamber, the valve body providing an inlet port communicating with said internal chamber, and first and second outlet ports,
   a tubular valve member slidably mounted within the valve body for axial movement between first and second limit positions, said valve member in its first limit position closing communication between the inlet port and the second outlet port, and in its second limit position closing communication between the inlet port and the first outlet port,
   a first compression spring biasing the valve member towards its first limit position and a second compression spring opposing said first compression spring biasing the valve member towards its second limit position,
   the second compression spring being of a shaped memory effect (SME) alloy and having a stiffness which in the martensitic state of the alloy, is insufficient to overcome the bias of the first compression spring whereby the valve member is retained in said first position, and having a stiffness which, in the austenitic state of the alloy, overcomes the bias of the first compression spring thereby to urge the valve member to said second position.

2. A temperature-responsive three-way line valve according to claim 1, wherein the second compression spring is disposed adjacent to the inlet port.

3. A temperature-responsive three-way line valve according to claim 2, wherein the second compression spring is a helical coil spring positioned to induce turbulent flow of fluid entering to the inlet port.

4. A temperature-responsive three-way line valve according to claim 3, wherein the valve body provides an internally directed retaining flange carrying a thermally insulating pad against which one end of the second compression spring bears thereby to minimize heat transfer between the compression spring and the valve body.

5. A temperature-responsive three-way line valve comprising:
   a tubular valve body defining an internal chamber, the valve body providing an inlet port at one end of the valve body, a first outlet port at the other end of the valve body, the inlet port and said first outlet port being axially aligned, and a second outlet port communicating with said chamber at a position between said inlet port and first outlet port,
   a tubular valve member slidably mounted within the valve body for axial movement between first and second limit positions, said valve member in its first limit position closing communication between the inlet port and the second outlet port, and in its second limit position closing communication between the inlet port and the first outlet port,
   the valve body providing internal abutment means engageable with one end of the valve member for defining said first limit position of the valve member,
   a spider assembly located within the valve body, the spider assembly being engageable with the other end of the valve member for defining the second limit position thereof,
   a first compression spring biasing the valve member towards its first limit position and a second compression spring opposing said first compression spring biasing the valve member towards its second limit position,
   the second compression spring being of a shaped memory effect (SME) alloy and having a stiffness which in the martensitic state of the alloy, is insufficient to overcome the bias of the first compression spring whereby the valve member is retained in said first position, and having a stiffness which, in the austenitic state of the alloy, overcomes the bias of the first compression spring thereby to urge the valve member to said second position.

6. A temperature-responsive three-way line valve according to claim 5, wherein the valve body provides an internally directed retaining flange carrying a thermally insulating pad against which one end of the second compression spring bears thereby to minimize heat transfer between the compression spring and the valve body.

7. A temperature-responsive three-way line valve according to claim 6, wherein the spider assembly comprises a spider support member having an imperforate central portion and a perforate peripheral portion defining a flow passage communicating with the first outlet port, and a retainer member mounted on said central portion of the support member, the retainer member supporting one end of the first compression spring, and the central portion cooperating with one end of the valve member in the second position of the valve member to close said flow passage.

8. A temperature-responsive three-way line valve according to claim 7, wherein the retainer member is mounted on said central portion of spider support member by adjustment means for adjusting the bias of said first compression spring.

* * * * *